United States Patent [19]
Krause

[11] Patent Number: 4,817,813
[45] Date of Patent: Apr. 4, 1989

[54] CLOSURE DEVICE IN MOTOR VEHICLES

[75] Inventor: Guenter Krause, Gröbenzell, Fed. Rep. of Germany

[73] Assignee: Bayerische Motoren Werke A.G., Munich, Fed. Rep. of Germany

[21] Appl. No.: 116,157

[22] Filed: Nov. 3, 1987

[30] Foreign Application Priority Data

Nov. 3, 1986 [DE] Fed. Rep. of Germany ....... 3637289

[51] Int. Cl.⁴ ................................................ B67C 3/00
[52] U.S. Cl. .................................. 220/86 R; 220/253; 220/DIG. 33
[58] Field of Search .................. 220/86 R, 85 S, 85 F, 220/DIG. 33, 253

[56] References Cited

U.S. PATENT DOCUMENTS

| 315,198 | 4/1885 | Wiegell | 220/253 X |
| 2,630,240 | 3/1953 | Gates | 220/253 |
| 3,845,877 | 11/1974 | Arnett et al. | 220/86 R |
| 4,579,245 | 4/1986 | Narushko | 220/253 |

FOREIGN PATENT DOCUMENTS 84145129.9 10/1984 Fed. Rep. of Germany .
8425667.8 11/1984 Fed. Rep. of Germany .

Primary Examiner—Steven M. Pollard
Attorney, Agent, or Firm—Barnes & Thornburg

[57] ABSTRACT

A closure device for an inlet line of a liquid tank in motor vehicles which prior to the feed of liquid into the inlet line is movable from a closing position into an open position and subsequent thereto again into the closing position; the closure device is undetachably seated on the inlet line and possesses a through-opening corresponding to the inlet line cross section which is arranged aligned with the inlet line in the open position and non-aligned with the inlet line cross section in the closing position. Its constructive realization enables both a manual as also an automatic actuation by a manipulator.

8 Claims, 1 Drawing Sheet

CLOSURE DEVICE IN MOTOR VEHICLES

BACKGROUND AND SUMMARY OF THE INVENTION

The present invention relates to a closure device for an inlet line of a liquid tank in motor vehicles which prior to the supply of liquid into the inlet line is adapted to be moved from a closing position into an open position and subsequent thereafter again into the closing position.

Such liquid tanks are used, for example, as the fuel tank or as the tank for the cooling liquid of the internal combustion engine. Other tanks or reservoirs may serve for storing the engine oil, the transmission oil or also cleaning liquid. With known closure devices, there exists in principle the danger that they are not adequately fastened and may be lost during a drive. It is already known to arrange the closure device in a housing which is closed by a flap, for example, the so-called tank flap. However, this requires an additional expenditure. The difficulties are enhanced in particular when it is intended to simplify the fuel intake and Possibly even to automate the same. Proposals in that direction can be found, for example, in the DE-PS 29 29 192. The problem thereby exists in principle to so construct the closure device that it enables in a simple manner both the filling of the liquid tank as also the closing of the inlet line.

The present invention is concerned with the task to provide a closure device of the aforementioned type which avoids the aforementioned disadvantages with constructively simple means and provides a significant contribution for the automation of the fuel input, i.e., for tanking.

The underlying problems are solved according to the present invention in that the closure device is seated on the inlet line in an undetachable manner, in that the closure device possesses a through-opening corresponding to the inlet line opening and in that the through opening is arranged aligned with the inlet line in the open position and is arranged beyond the inlet line opening in the closing position.

The non-detachability of the closure device represents a marked advantage compared to the known closure devices because a possibly open inlet line can be closed again at any time by the always present closure device. The movability of the closure device between the closing and the open position in conjunction with the interplay of through-opening and inlet line opening offers in a simple manner the possibility to do justice to the two essential tasks notwithstanding the non-detachability of the closure device; namely, to possibly completely open up the inlet line opening and to also completely close the same again. This can take place in a simple manner, possibly also with the aid of a manipulator, exclusively by the movement of the closure device from one position into the other.

This movement may be both a linear movement as also a rotary movement. The latter offers the advantage, especially as regards a movement of the closure device with the aid of a manipulator, to be possible with relatively small force expenditure and therewith to carry out the movement also under unfavorable climatic conditions during which the movability of the closure device is rendered more difficult by increased friction forces.

The movability of the closure device can be facilitated additionally by a marking which is opened up along its circumference in the closing and in the open position. It becomes possible with the assistance of a suitable receiver or pick-up for the position of the marking and by the shape of the marking freed or laid open by the closure device, to undertake the movement, respectively, to control by a manipulator during a movement.

In particular for the latter application, a further improvement results from an arrangement of the closure device in a housing which is closed off against the outside by a flap permeable to radiation of defined wavelength. The radiation emitted by a suitable device passes through the material of the flap which is possibly impermeable for visible light, and impinges on a suitable sensor arranged, for example, inside of the housing. A transmitting/receiving device may be provided supplementarily in the motor vehicle which signals the impingement of the radiation on the sensor and is used for the adjustment of the manipulator. Additionally, also an opening device for the flap can be controlled by the sensor which frees the access of the manipulator to the closure device.

BRIEF DESCRIPTION OF THE DRAWINGS

These and other objects, features and advantages of the Present invention will become more apparent from the following description when taken in connection with the accompanying drawing, which shows, for purposes of illustration only, one embodiment in accordance with the present invention, and wherein.

DETAILED DESCRIPTION OF THE DRAWINGS

Figure 1:
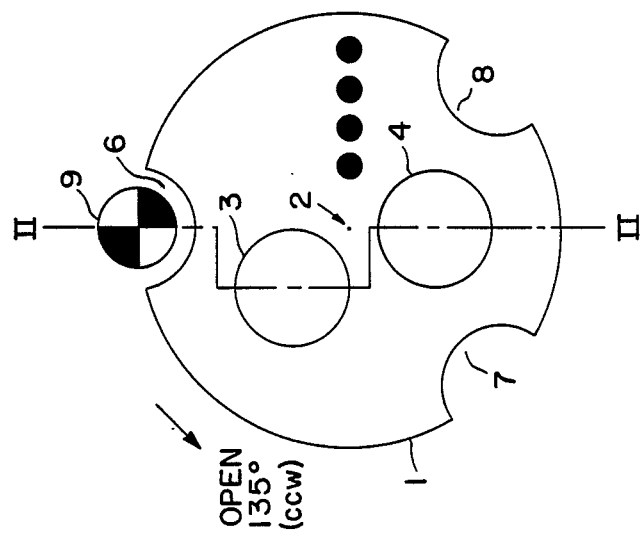
FIG. 1 is a schematic plan view on a closure device according to the present invention.

Referring now to the drawing wherein like reference numerals are used throughout the two views to designate like Parts, the plan view illustrated in FIG. 1 on a closure device 1 in accordance with the present invention shows the essential parts. The closure device is rotatably arranged about its center axis 2. It possesses a through-opening 3 which in the closing position illustrated in FIG. 1 is located non-aligned with respect to the opening 4 of an inlet line 5 illustrated in FIG. 2. Along the edge, the closure device 1 includes three notches 6, 7 and 8 of which the notch 6 lays open a fixed marking 9. Whereas the notch 7 serves exclusively for the improved handling of the closure device 1, the rotary movement of the closure device 1 can be automatically controlled by a manipulator with the assistance of the notches 6 and 8.

Figure 2:
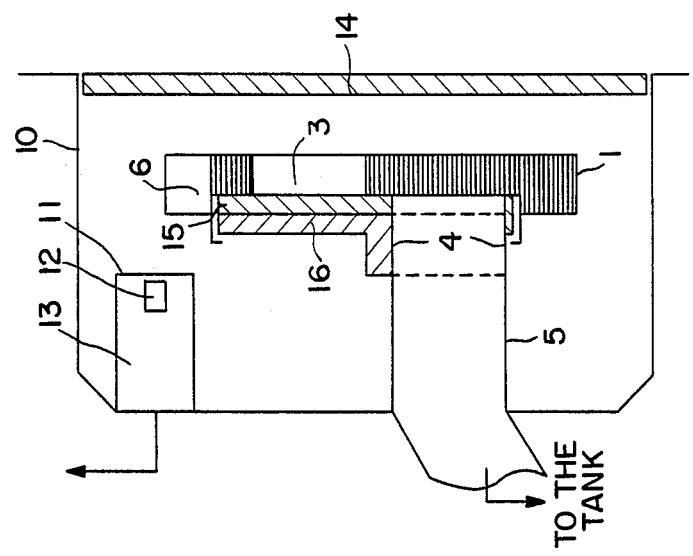
FIG. 2 is a cross-sectional view along the dotted line in FIG. 1, from which the arrangement and the manner of operation of the closure device can be further seen.

For that purpose, the closure device 1, starting from the closing position in FIG. 1, is rotated counterclockwise through an angle of, for example, 135° so far until the notch 8 completely opens up the marking 9 after completion of the rotary movement. This condition can be detected with the aid of a suitable sensor arrangement as illustrated in FIG. 2. In this rotary position of the closure device 1, the through-opening 3 is aligned with the opening 4 of the inlet line 5. It is possible therewith to fill-in liquid, for example, fuel into the inlet line 5 through the through-opening 3 into the inlet line 5 and by way of the latter into a tank connected thereto (not shown). After completion of the filling operation, the closure device 1 is to be rotated again in the clockwise direction back into the closing position; the notch 6 thereby opens up again the marking 9. The opening 4 is thereby again closed air—tight.

The cross section shown in FIG. 2 along the line II—II in FIG. 1 shows the cross section of the closure device 1 as well as constructive details thereof as well as additionally a housing 10 in which a sensor equipment 11 for the control of a manipulatory movement of the closure device 1 is accommodated.

The sensor equipment 11 consists of a receiver 12 sensitive to radiation of a defined wavelength, which is embedded in a carrier 13. Electronic equipment is connected in series with the receiver 12 which controls a device (not shown) for opening a flap 14 of the housing 10.

The flap 14 is permeable, for example, to electromagnetic radiation of a defined wavelength, for example, infrared light, and is non-transparent or impermeable to visible light. To the human eye, the flap 14 therefore appears non-transparent. If radiation of the predetermined wavelength, in the assumed case infrared light, is transmitted through the flap 14, then it impinges on the receiver 12. Corresponding to the position of the closure device 1, impermeable to this radiation, a variable quantity of radiation now impinges on the receiver 12. In the closing position of the closure device 1 illustrated in FIG. 1, this radiation quantity is greatest. The same is true after rotation of the closure device 1 into the open position in which the notch 8 enables an unobstructed incidence of the radiation on the receiver 12. In rotary positions of the closure device 1 between the closing position shown in FIG. 1 and the open position, the radiation quantity is considerably smaller. It is possible therewith to control by way of the sensor 11 not only the opening movement of the flap 14 but also a possibly present manipulatory rotary movement of the closure device 1.

Further constructive details of the closure device 1 can be seen from FIG. 2. Thus, a sealing sleeve 15 can be seen in this figure which is arranged on the backside of the closure device 1 between the latter and a support plate 16. The sealing sleeve 15 and the support plate 16 are not rotatable. During the rotary movement of the closure device 1, a relative rotary movement thus takes place between the closure device 1 and the sealing sleeve 15. An escape of liquid vapors or the like out of the liquid tank, respectively, penetration of atmospheric air into the tank is thus avoided during the entire rotary movement of the closure device 1. A tank ventilation and tank aeration system, which may possibly also be provided, is not shown for the sake of simplicity.

The closure device 1 thus enables to undertake the opening and closing of the opening 4 of the inlet line 5 either manually and possibly also automatically. The undetachable arrangement of the closure device 1, which cannot be lost, enables to close at any time and without problem the non-closed opening 4 which may possibly have not been closed accidentally.

While I have shown and described only one embodiment in accordance with the present invention, it is understood that the same is not limited thereto, but is susceptible of numerous changes and modifications as known to those skilled in the art, and I therefore do not wish to be limited to the details shown and described herein but intend to cover all such changes and modifications as are encompassed by the scope of the appended claims.

I claim:

1. A closure device for an inlet line of a liquid tank in motor vehicles which prior to the feed of liquid into the inlet line is operable to be moved from a closing position into an open position and subsequently thereafter again into the closing position, the closure device being undetachably seated on the inlet line and being provided with a through-opening corresponding to the inlet line opening, and the through-opening being arranged aligned with the inlet line in the open position and being arranged beyond the inlet line in the closing position.

2. A closure device according to claim 1, wherein the movement of the closure device is essentially a rotary movement about an axis which is at least approximately parallel to the direction of the inlet line.

3. A closure device according to claim 2, wherein the closure device opens up along its circumference a marking both in the closing as also in the open position.

4. A closure device according to claim 3, wherein the closure device is arranged in a housing means that is closed off against the outside by a flap means permeable to radiation of a predetermined wavelength.

5. A closure device according to claim 4, further comprising sensor means for radiation of a predetermined wavelength with an evaluation electronic means connected in series with the output of the sensor means and operable to control an opening mechanism for the flap means and monitoring the rotary movement of the closure device.

6. A closure device according to claim 1, wherein the closure device opens up along its circumference a marking both in the closing as also in the open position.

7. A closure device according to claim 1, wherein the closure device is arranged in a housing means that is closed off against the outside by a flap means permeable to radiation of a predetermined wavelength.

8. A closure device according to claim 7, further comprising sensor means for radiation of a predetermined wavelength with an evaluation electronic means connected in series with the output of the sensor means and operable to control an opening mechanism for the flap means and monitoring the rotary movement of the closure device.

* * * * *